United States Patent
Taguchi et al.

(10) Patent No.: US 9,804,671 B2
(45) Date of Patent: Oct. 31, 2017

(54) INPUT DEVICE AND NON-TRANSITORY COMPUTER-READABLE RECORDING MEDIUM

(71) Applicant: FUJITSU LIMITED, Kawasaki-shi, Kanagawa (JP)

(72) Inventors: Akinori Taguchi, Kawasaki (JP); Masayoshi Shimizu, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 14/924,205

(22) Filed: Oct. 27, 2015

(65) Prior Publication Data

US 2016/0048223 A1 Feb. 18, 2016

Related U.S. Application Data

(63) Continuation of application No. PCT/JP2013/062949, filed on May 8, 2013.

(51) Int. Cl.
| | | |
|---|---|---|
| *G06F 3/01* | (2006.01) | |
| *G06F 3/0346* | (2013.01) | |
| *G06F 3/038* | (2013.01) | |
| *G06F 3/0481* | (2013.01) | |
| *G06F 3/0487* | (2013.01) | |

(52) U.S. Cl.
CPC ............ *G06F 3/013* (2013.01); *G06F 3/038* (2013.01); *G06F 3/0346* (2013.01); *G06F 3/0487* (2013.01); *G06F 3/04812* (2013.01); *G06F 2203/0381* (2013.01)

(58) Field of Classification Search
CPC .................. G06F 3/013; G06F 2200/1637
See application file for complete search history.

(56) References Cited

U.S. PATENT DOCUMENTS

| | | | | |
|---|---|---|---|---|
| 8,643,680 | B2 * | 2/2014 | Baldwin | G06F 3/013 |
| | | | | 345/156 |
| 8,793,620 | B2 * | 7/2014 | Stafford | G06F 3/012 |
| | | | | 345/159 |
| 2006/0094480 | A1 | 5/2006 | Tanaka | |
| 2011/0057880 | A1 | 3/2011 | Kasahara | |
| 2012/0169596 | A1 | 7/2012 | Zhuang | |

(Continued)

FOREIGN PATENT DOCUMENTS

| | | |
|---|---|---|
| EP | 2293176 | 3/2011 |
| JP | 8-335135 | 12/1996 |

(Continued)

OTHER PUBLICATIONS

JPOA—Office Action of Japanese Patent Application No. 2015-515673, dated Jul. 19, 2016, with English Translation of the relevant part, p. 1, line 24 to line 37, line 41 to line 42 of the Office Action.

(Continued)

*Primary Examiner* — Patrick F Marinelli
(74) *Attorney, Agent, or Firm* — Fujitsu Patent Center

(57) ABSTRACT

An input device comprising: a processor that executes a process comprising: first detecting an eye-gaze position on a screen; comparing a current specified position and the eye-gaze position; and setting a cursor position to the specified position until a distance between the specified position and the eye-gaze position reaches a threshold or more.

3 Claims, 7 Drawing Sheets

(56) References Cited

U.S. PATENT DOCUMENTS

| | | | |
|---|---|---|---|
| 2012/0188148 A1* | 7/2012 | DeJong | G02B 27/0093 345/8 |
| 2012/0256967 A1* | 10/2012 | Baldwin | G06F 3/013 345/684 |
| 2012/0272179 A1* | 10/2012 | Stafford | G06F 3/012 715/781 |
| 2014/0009739 A1* | 1/2014 | Greco | A61B 3/113 351/206 |
| 2014/0164756 A1* | 6/2014 | Huang | G06F 3/012 713/100 |
| 2014/0232653 A1 | 8/2014 | Yagihashi et al. | |
| 2014/0361971 A1* | 12/2014 | Sala | G06F 3/041 345/156 |
| 2015/0126845 A1* | 5/2015 | Jin | G02B 27/017 600/383 |
| 2015/0268799 A1* | 9/2015 | Starner | G02B 27/017 345/175 |
| 2015/0277730 A1* | 10/2015 | Rosenberg | E21B 47/18 715/753 |
| 2016/0034030 A1* | 2/2016 | Lee | G06F 3/013 345/156 |
| 2016/0048223 A1* | 2/2016 | Taguchi | G06F 3/013 345/157 |
| 2016/0217767 A1* | 7/2016 | Ben-Bassat | G06F 3/013 |

FOREIGN PATENT DOCUMENTS

| | | |
|---|---|---|
| JP | 11-095910 | 4/1999 |
| JP | 11-259224 | 9/1999 |
| JP | 2006-113859 | 4/2006 |
| JP | 2006-309291 | 11/2006 |
| JP | 2007-121489 | 5/2007 |
| JP | 2009-064395 | 3/2009 |
| JP | 2009-251658 | 10/2009 |
| JP | 2011-059781 | 3/2011 |
| JP | 2013-506209 | 2/2013 |
| JP | 2013-073330 | 4/2013 |
| KR | 10-2012-0080215 | 7/2012 |
| WO | 2012/145180 A1 | 10/2012 |

OTHER PUBLICATIONS

KROA—Notice of Preliminary Rejection dated Nov. 17, 2016 for corresponding Korean Patent Application No. 10-2015-7031560, with English translation.

EESR—Extended European Search Report of European Patent Application No. 13883906.3 dated Apr. 28, 2016.

KROA—Office Action of Korean Patent Application No. 10-2015-7031560 dated Apr. 28, 2017, with English translation.

International Search Report and Written Opinion of the International Searching Authority (Form PCT/ISA/210, Form PCT/ISA/237), mailed in connection with PCT/JP2013/062949 and dated Aug. 13, 2013 (11 pages).

* cited by examiner

INPUT DEVICE AND NON-TRANSITORY COMPUTER-READABLE RECORDING MEDIUM

CROSS-REFERENCE TO RELATED APPLICATION(S)

This application is a continuation application of International Application No. PCT/JP2013/062949, filed on May 8, 2013, and designating the U.S., the entire contents of which are incorporated herein by reference.

FIELD

The embodiment discussed herein is related to a correlation coefficient calculation method or the like.

BACKGROUND

In addition to a keyboard and a mouse, eye-gaze input, tilt input, or the like is used as a method of moving a cursor position on a screen. Among these methods, the eye-gaze input allows a cursor to be moved to a distant position faster as compared with the case where the cursor is moved by a mouse or with the tilt input.

In the eye-gaze input, because a displacement occurs in the positions of eye gaze, finely specifying the position is more difficult as compared with the case where the cursor is moved by the mouse.

Therefore, it is conceivable to combine a method which is advantageous to specification of a rough position as compared with the other methods but is disadvantageous to specification of a fine position as compared with the other methods and a method which is disadvantageous to specification of a rough position as compared with the other methods but is advantageous to specification of a fine position as compared with the other methods. For example, it is conceivable that a rough position is specified by using eye-gaze input and a fine position is specified by using a mouse or a keyboard. These related-art examples are described, for example, in Japanese Laid-open Patent Publication No. 2009-64395, Japanese Laid-open Patent Publication No. 2009-251658, Japanese Laid-open Patent Publication No. 2007-121489 and Japanese Laid-open Patent Publication No. 11-95910.

However, the conventional technology has a problem that a position not intended by a user is specified.

For example, the case in which a rough position is specified by using eye-gaze input and a fine position is specified by using a mouse will be explained below. In the eye-gaze input, it is determined that an instruction to specify a position is always made unless the user performs a specific operation. Therefore, when a plurality of methods for specifying a position are combined with each other and if a fine position is specified by other method and the method is then changed to a method such as eye-gaze input, the position specified by the other method may be moved to other position even if there is no intention to move the position.

In one of aspects, it is an object to provide an input device and an input program capable of preventing specification of a position not intended by the user.

SUMMARY

According to an aspect of an embodiment, an input device including: a processor that executes a process including: first detecting an eye-gaze position on a screen; comparing a current specified position and the eye-gaze position; and setting a cursor position to the specified position until a distance between the specified position and the eye-gaze position reaches a threshold or more.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of the input device and the input program according to the present invention will be explained in detail below with reference to the accompanying drawings. The invention is not limited by the embodiments.

First Embodiment

Figure 1:
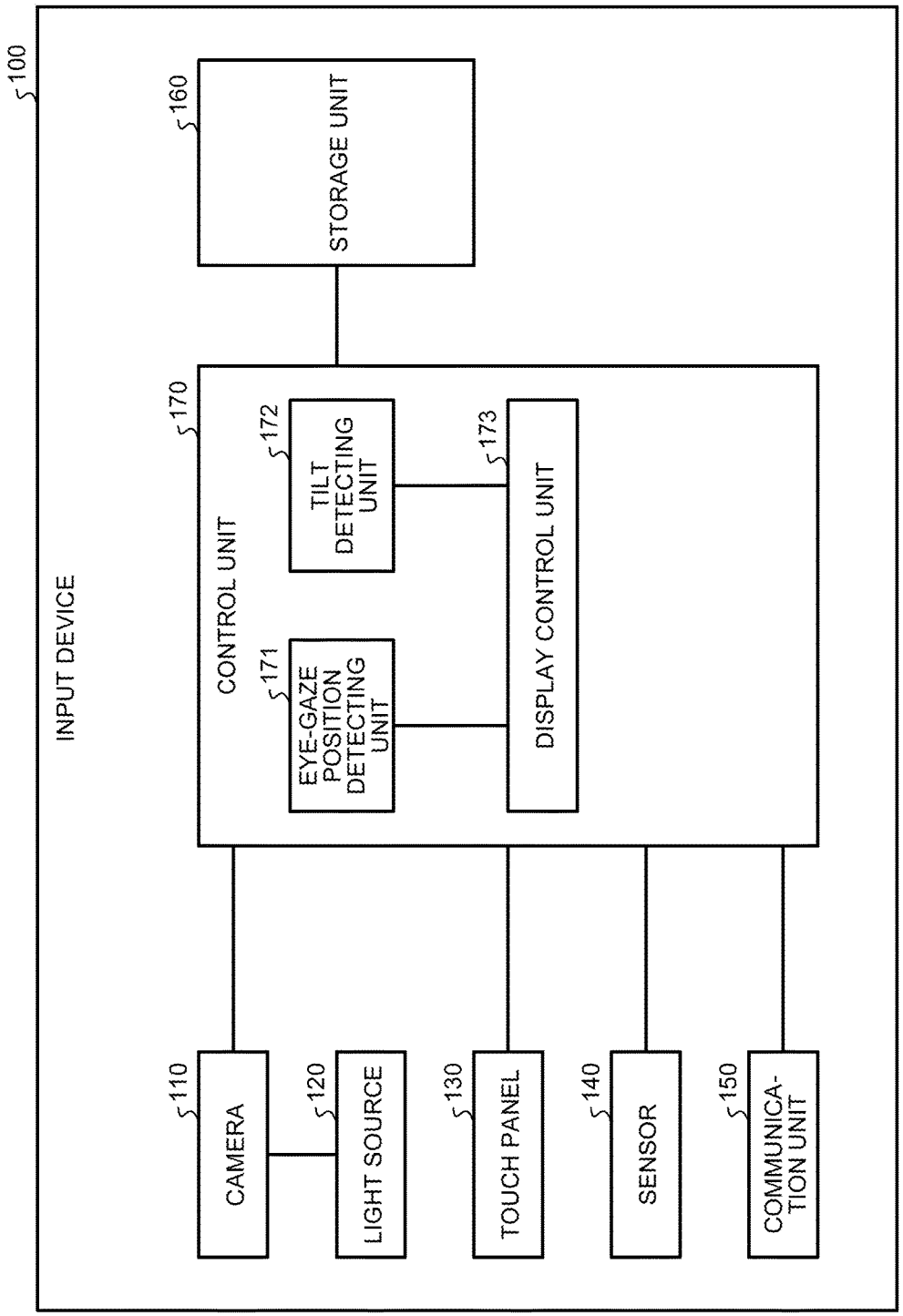
FIG. 1 is a diagram of a configuration of an input device according to a first embodiment.

A configuration of an input device according to a first embodiment will be explained. FIG. 1 is a diagram of the configuration of the input device according to the first embodiment. As illustrated in FIG. 1, an input device 100 includes a camera 110, a light source 120, a touch panel 130, a sensor 140, and a communication unit 150. The rest of the configuration is the same as that of a known tablet terminal, and explanation thereof is therefore omitted herein.

The camera 110 is an imaging device using a Charge Coupled Device (CCD), Complementary Metal Oxide Semiconductor (CMOS), or the like. The camera 110 captures an image of a subject included in an imaging range and outputs image data of the captured subject to a control unit 170.

For example, the camera 110 controls the light source 120 at a timing of capturing an image to irradiate infrared rays to the subject. When a user's eye is included in the subject captured by the camera 110, an image is captured in which reflection of light on the retina is captured by the camera 110 and a pupil part of the eye appears more brightly than the other parts. For the camera 110, a camera mounted on the input device 100 at the time of shipment may be used or an externally connected digital camera or the like may be used.

The light source 120 is a device that irradiates infrared rays in response to a control instruction of the camera 110.

The touch panel 130 is an interface with two functions of display and input. The touch panel 130 displays information output from the control unit 170. For example, the touch panel 130 displays a cursor at a position specified by the control unit 170. When accepting a touch operation, the touch panel 130 outputs the information for the touched screen position to the control unit 170.

The sensor 140 is a sensor that measures acceleration of the input device 100 in the vertical and horizontal directions by capturing a change in the position of mass due to the acceleration. The sensor 140 outputs the information for the measured acceleration to the control unit 170.

The communication unit 150 is a processor connected to a network to execute data communication with other device. For example, the communication unit 150 corresponds to a wireless communication device. The control unit 170, which is explained later, executes data communication with an external device or the like on the network through the communication unit 150.

A storage unit 160 is a storage device that stores various pieces of information. The storage unit 160 corresponds to a semiconductor memory device such as a RAM (Random Access Memory), a ROM (Read Only Memory), and a flash memory, or to a storage device such as a hard disk and an optical disc.

The control unit 170 includes an eye-gaze position detecting unit 171, a tilt detecting unit 172, and a display control unit 173. For example, the control unit 170 corresponds to an integrated device such as ASIC (Application Specific Integrated Circuit) and FPGA (Field Programmable Gate Array). The control unit 170 also corresponds to an electronic circuit such as a CPU and an MPU (Micro Processing Unit).

The eye-gaze position detecting unit 171 is a processor that detects an eye-gaze position on the touch panel 130. The eye-gaze position detecting unit 171 outputs information of the eye-gaze position to the display control unit 173. For example, the eye-gaze position detecting unit 171 applies an algorithm such as a corneal reflection method to an image of the subject output by the camera 110 and detects the position of a gaze point indicated by an eye gaze direction from the pupil center of the eye. The position of the gaze point is described as an eye-gaze position in the present embodiment.

The case of detecting the eye-gaze position using the corneal reflection method has been explained herein; however, the eye-gaze position may be detected using any other method. For example, the input device 100 may detect the eye-gaze position by dividing the screen of the touch panel 130 into areas, learning a shape of the eye that is looking at a divided area, and performing template matching with a shape of the eye extracted from an image input from the camera 110. The input device 100 may allow the user to wear a headset for detecting an eye-gaze position and acquire the eye-gaze position detected by the headset.

The tilt detecting unit 172 is a processor that acquires the information for acceleration from the sensor 140 and converts the acquired information for acceleration to a tilt. For example, the tilt detecting unit 172 stores a conversion table in which a value of acceleration and a direction and magnitude of a tilt are associated with each other, and converts the value of acceleration to the direction and magnitude of the tilt based on the conversion table. In the description herein below, the direction and magnitude of the tilt are collectively described as tilt information as needed. The tilt detecting unit 172 outputs the tilt information to the display control unit 173.

The display control unit 173 is a processor that specifies a cursor position based on the eye-gaze position and the tilt information and displays the cursor at a position on the touch panel 130 corresponding to the specified cursor position.

The display control unit 173 displays various images on the touch panel 130 in the same manner as that of the known tablet terminal.

First of all, an example of processing in which the display control unit 173 moves the cursor according to the eye-gaze position will be explained. The display control unit 173 compares a current cursor position and an eye-gaze position, and performs processing of setting the cursor position until a distance between the current cursor position and the eye-gaze position reaches a threshold or more.

Figure 2:
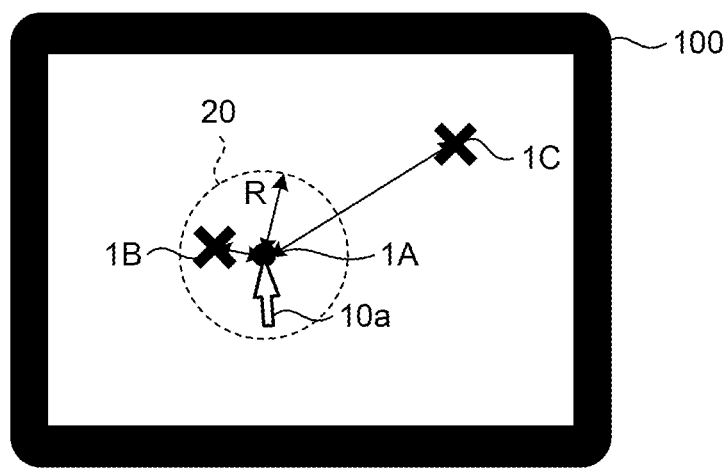
FIG. 2 is a diagram for explaining processing of a display control unit according to the first embodiment.

FIG. 2 is a diagram for explaining processing of the display control unit according to the first embodiment. In FIG. 2, for the sake of convenience of explanation, a current position of a cursor 10a is set as a position 1A. The display control unit 173 determines whether the position of the cursor 10a is to be set depending on whether the eye-gaze position is present in an area 20 of a circle of radius R centered at the position 1A. When the eye-gaze position is included in the area 20, the display control unit 173 sets the position of the cursor 10a, and moves the position of the cursor 10a to the eye-gaze position when the eye-gaze position is not included in the area 20.

In FIG. 2, when the eye-gaze position is 1B, the eye-gaze position is included in the area 20, and therefore the display control unit 173 sets the position of the cursor 10a. When the eye-gaze position is included in the area 20, it means that the user is interested in the area near the cursor 10a. Here, if the cursor 10a is moved according to the eye-gaze position, it is difficult to move the cursor 10a caused by blurring of the eye-gaze position. Therefore, the display control unit 173 does not move the cursor 10a according to the eye-gaze position. However, as explained later, the display control unit 173 moves the cursor 10a according to the tilt information acquired from the tilt detecting unit 172.

In FIG. 2, when the eye-gaze position is 1C, because the eye-gaze position is not included in the area 20, the display control unit 173 moves the position of the cursor 10a to the eye-gaze position 1C. When the eye-gaze position is not included in the area 20, it means that the user is not interested in the area near the cursor 10a, and, therefore, there is no problem even if the cursor 10a is moved according to the eye-gaze position.

Then, an example of processing in which the display control unit 173 moves the cursor according to the tilt information will be explained. For example, when accepting a predetermined change instruction while performing processing of moving the cursor based on the eye-gaze position, the display control unit 173 starts the processing of moving the cursor according to the tilt information. For example, when a start button displayed on the touch panel 130 is selected or when the magnitude of the tilt reaches the threshold or more, the display control unit 173 may start the processing of moving the cursor according to the tilt information.

The display control unit 173 stores an association table in which a magnitude of the tilt is associated with a moving amount of the cursor, and moves the cursor based on the association table. The moving direction of the cursor follows the direction of the tilt included in the tilt information.

As illustrated in FIG. 2, when the eye-gaze position is 1B, the eye-gaze position is included in the area 20, and therefore the display control unit 173 sets the position of the cursor 10a. However, the setting means that the movement of the cursor with respect to "eye-gaze position" is set. In other words, the display control unit 173 moves the cursor 10a according to the tilt information even if the eye-gaze position is included in the area 20 while performing the processing of moving the cursor according to the tilt information.

When an end button, which is not illustrated on the touch panel 130, is selected, the display control unit 173 ends the processing.

The display control unit 173 may temporarily stop the processing of the tilt detecting unit 172 while performing the processing of moving the cursor position based on the eye-gaze position. The display control unit 173 may also temporarily stop the processing of the eye-gaze position detecting unit 171 while performing the processing of moving the cursor position based on the tilt information.

Figure 3:
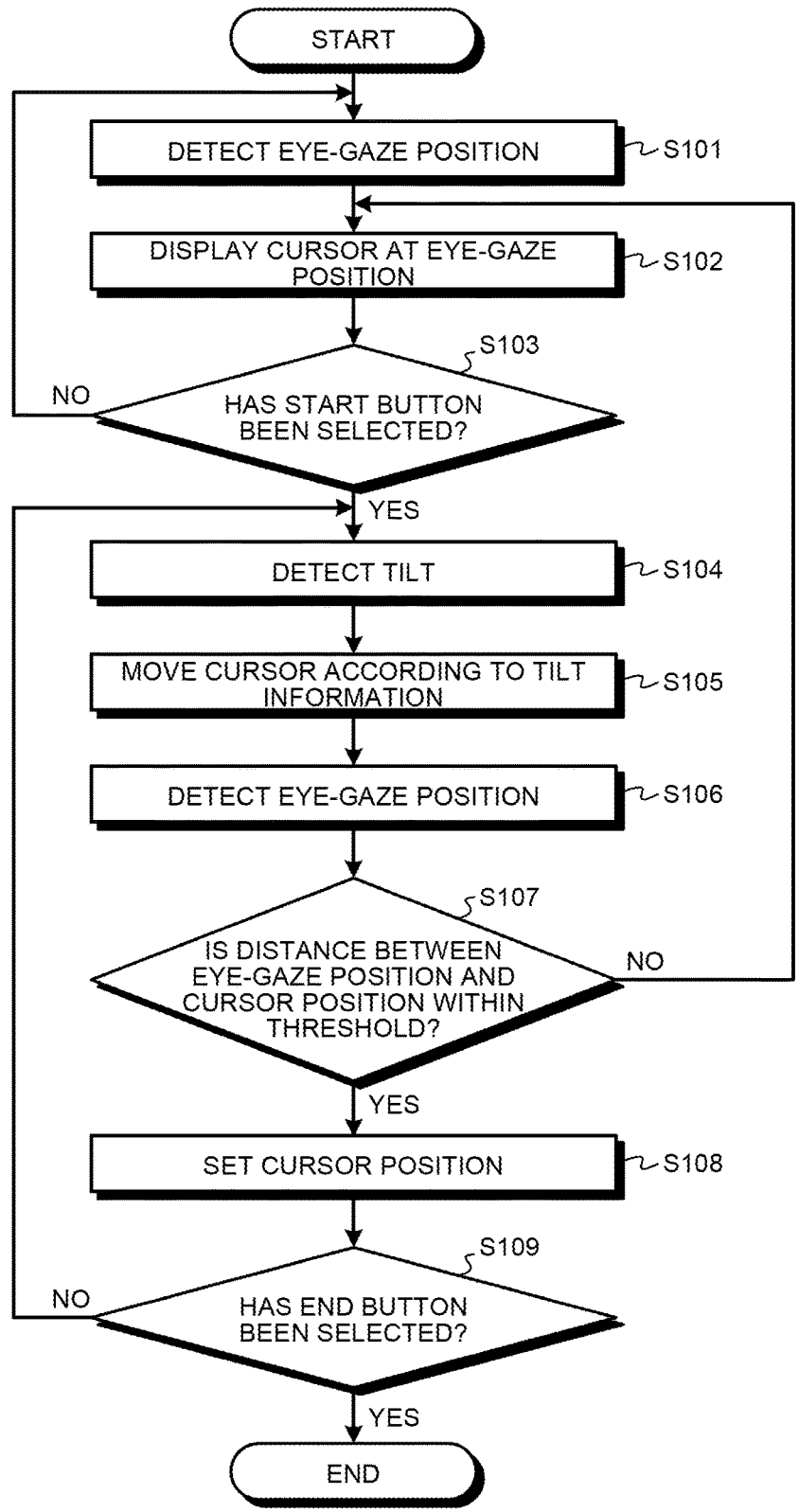
FIG. 3 is a flowchart of a procedure of the input device according to the first embodiment.

A procedure of the input device 100 according to the first embodiment will be explained next. FIG. 3 is a flowchart of the procedure of the input device according to the first embodiment. For example, the processing illustrated in FIG. 3 is started in response to detection of the eye-gaze position of the user.

As illustrated in FIG. 3, the input device 100 detects an eye-gaze position (Step S101), and displays the cursor at the eye-gaze position (Step S102). The input device 100 determines whether the start button has been selected (Step S103). When the start button has not been selected (No at Step S103), the input device 100 proceeds to Step S101.

Meanwhile, when the start button has been selected (Yes at Step S103), the input device 100 detects a tilt (Step S104), and moves the cursor according to the tilt information (Step S105). The input device 100 detects the eye-gaze position (Step S106), and determines whether a distance between the eye-gaze position and the cursor position is within a threshold (Step S107). When a distance between the eye-gaze position and the cursor position is not within the threshold (No at Step S107), the input device 100 proceeds to Step S102.

On the other hand, when a distance between the eye-gaze position and the cursor position is within the threshold (Yes at Step S107), the input device 100 sets the cursor position (Step S108). When the end button has not been selected (No at Step S109), the input device 100 proceeds to Step S104. Meanwhile, when the end button has been selected (Yes at Step S109), the input device 100 ends the processing.

Advantageous effects of the input device 100 according to the first embodiment will be explained next. The input device 100 detects an eye-gaze position on the touch panel 130, and compares the current cursor position and the eye-gaze position. The input device 100 sets the cursor position until a distance between the current cursor position and the eye-gaze position reaches the threshold or more. Therefore, according to the input device 100, it is possible to prevent specification of a position not intended by the user.

The input device 100 stops the cursor at the cursor position according to the eye-gaze position until the distance between the current cursor position and the eye-gaze position reaches the threshold or more, and moves the cursor position according to the tilt information detected by the tilt detecting unit 172. Therefore, according to the input device 100, it is possible that the user roughly specifies a cursor position by his/her eye gaze and finely adjusts the cursor position by the tilt.

The input device 100 temporarily stops the processing of the tilt detecting unit 172 while performing the processing of moving the cursor position based on the eye-gaze position. In addition, the input device 100 temporarily stops the processing of the eye-gaze position detecting unit 171 while performing the processing of moving the cursor position based on the tilt information. Therefore, the input device 100 can achieve power saving.

The display control unit 173 may move the cursor position based on a moving direction of the input device 100 instead of the tilt. That is, the display control unit 173 acquires the information for acceleration from the sensor 140, and moves the cursor based on the association table in which the acceleration is associated with the moving direction. The display control unit 173 stops the cursor at the cursor position according to the eye-gaze position until the distance between the cursor position and the eye-gaze position reaches the threshold or more, and moves the cursor position according to the acceleration acquired from the sensor 140.

Second Embodiment

Figure 4:
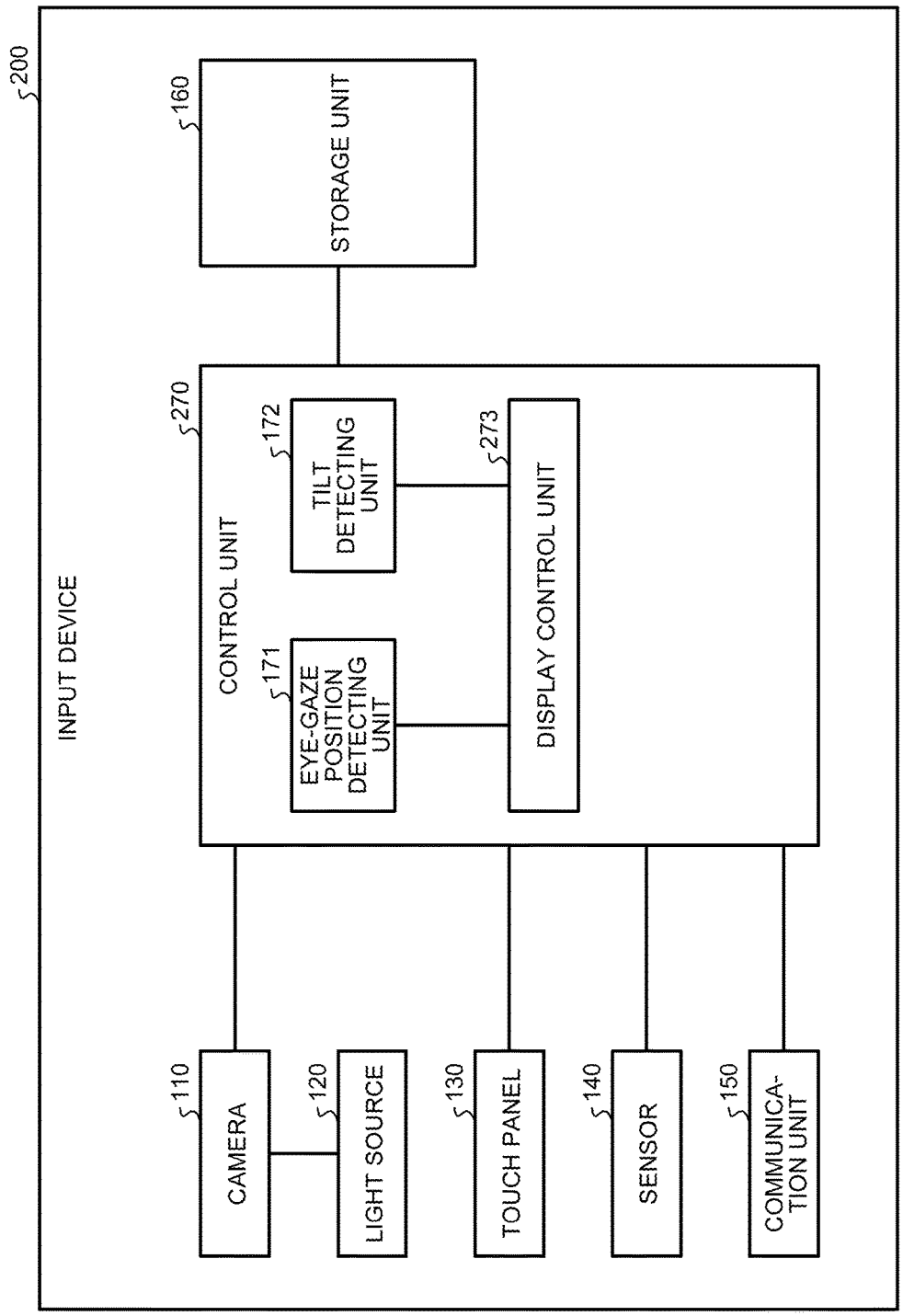
FIG. 4 is a diagram of a configuration of an input device according to a second embodiment.

A configuration of an input device according to a second embodiment will be explained below. FIG. 4 is a diagram of the configuration of the input device according to the second embodiment. As illustrated in FIG. 4, an input device 200 includes the camera 110, the light source 120, the touch panel 130, the sensor 140, and the communication unit 150. The rest of the configuration is the same as that of the known tablet terminal, and explanation thereof is therefore omitted herein.

Explanation of the camera 110, the light source 120, the touch panel 130, the sensor 140, the communication unit 150, and the storage unit 160 is the same as that of the camera 110, the light source 120, the touch panel 130, the sensor 140, the communication unit 150, and the storage unit 160, which are illustrated in FIG. 1. Therefore, the explanation of each of the devices 110 to 160 will be omitted.

A control unit 270 includes the eye-gaze position detecting unit 171, the tilt detecting unit 172, and a display control unit 273. Explanation of the eye-gaze position detecting unit 171 and the tilt detecting unit 172 is the same as that of the eye-gaze position detecting unit 171 and the tilt detecting unit 172 illustrated in FIG. 1, and therefore the same reference signs are assigned to the units, and the explanation thereof is omitted.

The display control unit 273 is a processor that specifies a cursor position based on the eye-gaze position and the tilt information and displays the cursor at a position on the touch panel 130 corresponding to the specified cursor position.

Figure 5:
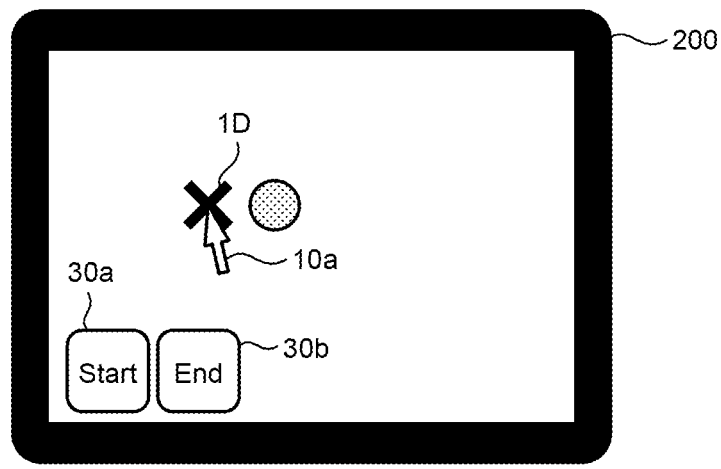
FIG. 5 is a diagram for explaining processing of a display control unit according to the second embodiment.

FIG. 5 is a diagram for explaining processing of a display control unit according to the second embodiment. First of all, the display control unit 273 moves the position of the cursor 10a according to the eye-gaze position detected by the eye-gaze position detecting unit 171. In FIG. 5, when the eye-gaze position is 1D, the display control unit 273 moves the cursor 10a to the eye-gaze position 1D.

Then, when a start button 30a is selected by the user, the display control unit 273 moves the position of the cursor 10a based on the tilt information acquired from the tilt detecting unit 172. The processing that the display control unit 273 moves the position of the cursor 10a based on the tilt information is the same as that of the display control unit 173 according to the first embodiment.

When the start button 30a is selected while performing the processing of moving the position of the cursor 10a based on the tilt information, the display control unit 273 changes the processing to processing of moving the position of the cursor 10a according to the eye-gaze position. When an end button 30b is selected by the user, the display control unit 273 ends the processing.

Figure 6:
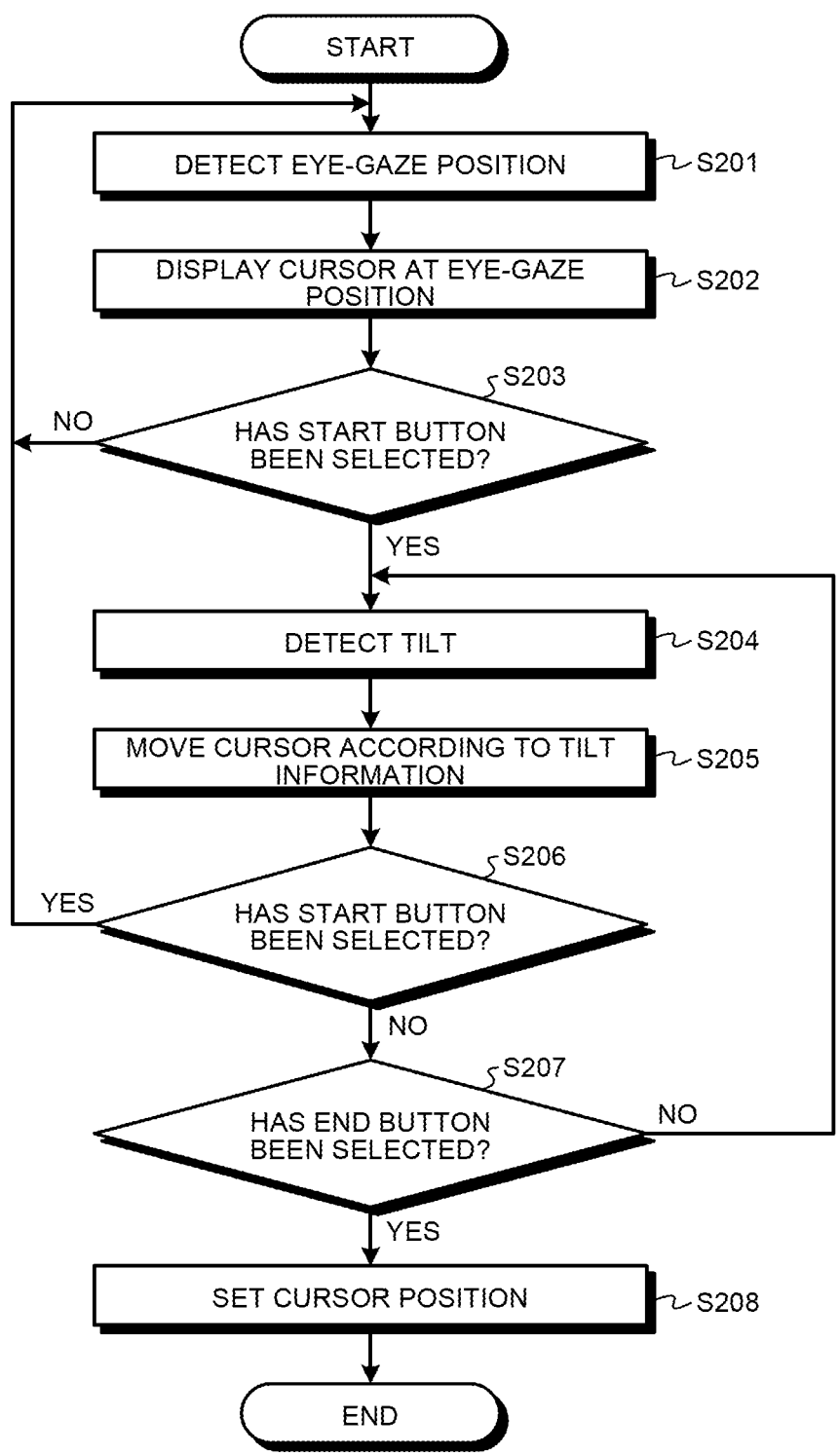
FIG. 6 is a flowchart of a procedure of the input device according to the second embodiment.

A procedure of the input device 200 according to the second embodiment will be explained next. FIG. 6 is a flowchart of the procedure of the input device according to the second embodiment. For example, the processing illustrated in FIG. 6 is started in response to detection of the eye-gaze position of the user.

As illustrated in FIG. 6, the input device 200 detects an eye-gaze position (Step S201), and displays the cursor at the eye-gaze position (Step S202). The input device 200 determines whether the start button has been selected (Step S203). When the start button has not been selected (No at Step S203), the input device 200 proceeds to Step S201.

Meanwhile, when the start button has been selected (Yes at Step S203), the input device 200 detects a tilt (Step S204), and moves the cursor according to the tilt information (Step S205). The input device 200 determines whether the start button has been selected (Step S206). When the start button has been selected (Yes at Step S206), the input device 200 proceeds to Step S201.

On the other hand, when the start button has not been selected (No at Step S206), the input device 200 determines whether the end button has been selected (Step S207). When the end button has not been selected (No at Step S207), the input device 200 proceeds to Step S204. Meanwhile, when the end button has been selected (Yes at Step S207), the input device 200 sets the cursor position (Step S208). The input device 200 performs various types of processing corresponding to the cursor position after the cursor position is set.

Advantageous effects of the input device 200 according to the second embodiment will be explained next. The input device 200 accepts whether to move the cursor position to the eye-gaze position detected by the eye-gaze position detecting unit 171 or to move the cursor position according to the tilt detected by the tilt detecting unit 172, and moves the cursor position to either one of them. Therefore, the user can select whether to specify the position based on the eye gaze or to specify the position based on the tilt, so that the cursor can be effectively moved to a desired position.

The input device 200 may perform the processing of the display control unit 273 and the processing of the display control unit 173 in combination with each other.

Figure 7:
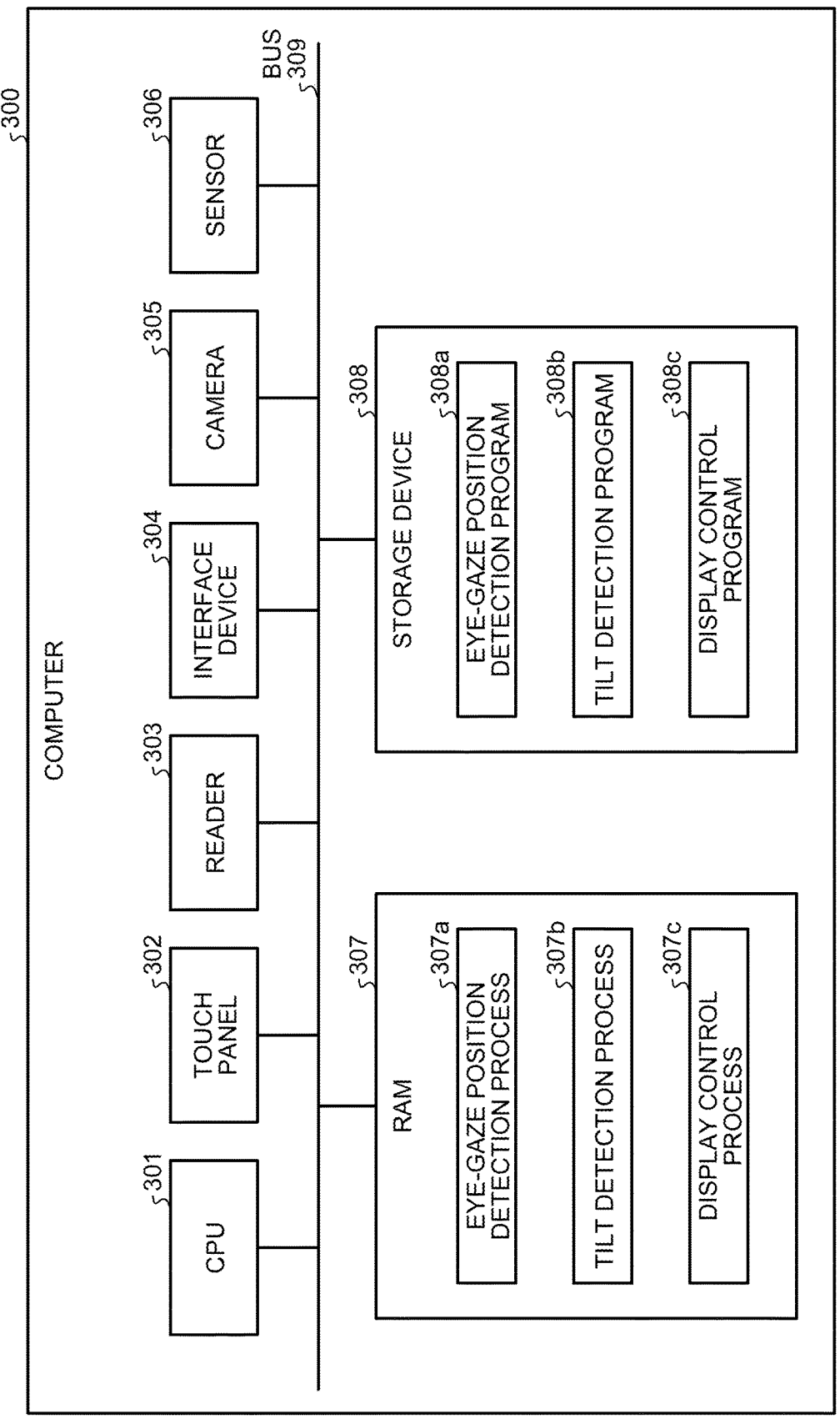
FIG. 7 is a diagram of an example of a computer that performs an input program.

An example of a computer that performs a support program for implementing the same functions as these of the input device described in the embodiment will be explained next. FIG. 7 is a diagram of an example of the computer that performs an input program.

As illustrated in FIG. 7, a computer 300 includes a CPU 301 that executes various operations, and a touch panel 302 that accepts data input from the user and displays various pieces of information. The computer 300 also includes a reader 303 that reads a program or the like from a storage medium, and an interface device 304 that performs data exchange with other computer through a network. The computer 300 further includes a camera 305 and a sensor 306 that detects acceleration. The computer 307 also includes a RAM 306 that temporarily stores various pieces of information, and a storage device 308. The devices 301 to 308 are connected to a bus 309.

The storage device 308 includes an eye-gaze position detection program 308a, a tilt detection program 308b, and a display control program 308c. The CPU 301 reads each of the programs 308a, 308b, and 308c to be loaded to the RAM 307.

The eye-gaze position detection program 308a functions as an eye-gaze position detection process 307a. The tilt detection program 308b functions as a tilt detection process 307b. The display control program 308c functions as a display control process 307c.

For example, the eye-gaze position detection process 307a corresponds to the eye-gaze position detecting unit 171. The tilt detection process 307b corresponds to the tilt detecting unit 172. The display control process 307c corresponds to the display control units 173 and 273.

The programs 308a to 308c do not need to be necessarily stored in the storage device 308 from the beginning. For example, the programs are previously stored in "portable physical medium" such as a flexible disk (FD), CD-ROM, a DVD disc, a magneto-optical disc, or an IC card, which is inserted into the computer 300. Then, the computer 300 may read the programs 308a to 308c from each of the mediums and perform the programs.

REFERENCE SIGNS LIST

According to one aspect of the present invention, it is possible to prevent specification of a position not intended by the user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An input device comprising:
   a touch panel that displays a cursor; and
   a processor that executes a process including:
      detecting an eye-gaze position on the touch panel from a camera that captures a reflection of light on retina of a user who uses the touch panel;
      acquiring information from a sensor for tilt information that measures acceleration of the input device; and
      specifying a cursor position based on the eye-gaze position and the tilt information and displaying the cursor at a position on the touch panel corresponding to the specified cursor position;
   wherein the specifying includes comparing a current cursor position and an eye-gaze position, and performing processing of setting the cursor position until a distance between the current cursor position and the eye-gaze position reaches a threshold or more;
   wherein the position of the cursor is to be set depending on whether the eye-gaze position is present in an area centered at a position displayed on the touch panel;
   when the eye-gaze position is included in the area, the displaying includes setting the position of the cursor, and moving the position of the cursor to the eye-gaze position when the eye-gaze position is not included in the area;
   when the eye-gaze position is included in the area, the displaying includes setting the position of the cursor, and not moving the position of the cursor to the eye-gaze position when the eye-gaze position is in the area,
   wherein, when a start button, that is displayed on the touch panel, is selected or when a magnitude of tilt of the input device reaches a threshold or more, the displaying includes starting the processing of moving the cursor according to the tilt information.

2. A non-transitory computer-readable recording medium having stored therein an input program that causes a processor of an input device, wherein the input device comprises a touch panel that displays a cursor, to execute a process comprising:

detecting an eye-gaze position on the touch panel from a camera that captures a reflection of light on retina of a user who uses the touch panel;

acquiring information from a sensor for tilt information that measures acceleration of the input device; and specifying a cursor position based on the eye-gaze position and the tilt information and displaying the cursor at a position on the touch panel corresponding to the specified cursor position;

wherein the specifying includes comparing a current cursor position and an eye-gaze position, and performing processing of setting the cursor position until a distance between the current cursor position and the eye-gaze position reaches a threshold or more;

wherein the position of the cursor is to be set depending on whether the eye-gaze position is present in an area centered at a position displayed on the touch panel;

when the eye-gaze position is included in the area, the displaying includes setting the position of the cursor, and moving the position of the cursor to the eye-gaze position when the eye-gaze position is not included in the area;

when the eye-gaze position is included in the area, the displaying includes setting the position of the cursor, and not moving the position of the cursor to the eye-gaze position when the eye-gaze position is in the area, wherein, when a start button, that is displayed on the touch panel, is selected or when a magnitude of tilt of the input device reaches a threshold or more, the displaying includes starting the processing of moving the cursor according to the tilt information.

3. An input method executing a process by an input device that includes a touch panel that displays a cursor, the process comprising:

detecting an eye-gaze position on the touch panel from a camera that captures a reflection of light on retina of a user who uses the touch panel;

acquiring information from a sensor for tilt information that measures acceleration of the input device; and specifying a cursor position based on the eye-gaze position and the tilt information and displaying the cursor at a position on the touch panel corresponding to the specified cursor position;

wherein the specifying includes comparing a current cursor position and an eye-gaze position, and performing processing of setting the cursor position until a distance between the current cursor position and the eye-gaze position reaches a threshold or more;

wherein the position of the cursor is to be set depending on whether the eye-gaze position is present in an area centered at a position displayed on the touch panel;

when the eye-gaze position is included in the area, the displaying includes setting the position of the cursor, and moving the position of the cursor to the eye-gaze position when the eye-gaze position is not included in the area;

when the eye-gaze position is included in the area, the displaying includes setting the position of the cursor, and not moving the position of the cursor to the eye-gaze position when the eye-gaze position is in the area, wherein, when a start button, that is displayed on the touch panel, is selected or when a magnitude of tilt of the input device reaches a threshold or more, the displaying includes starting the processing of moving the cursor according to the tilt information.

\* \* \* \* \*